Figure 1:
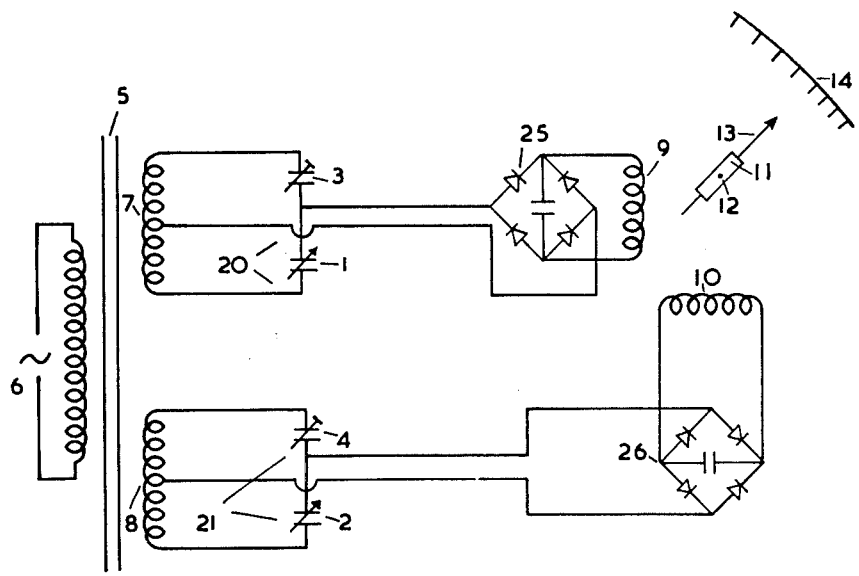

March 13, 1956   E. B. MOSS   2,737,808
LIQUID CONTENTS GAUGES
Filed Aug. 23, 1950

INVENTOR:
Eric B. Moss
BY: *Marie of Hall*
ATTORNEYS.

United States Patent Office 2,737,808
Patented Mar. 13, 1956

2,737,808

LIQUID CONTENTS GAUGES

Eric Beecroft Moss, Cricklewood, London, England, assignor to S. Smith & Sons (England) Limited, London, England Application August 23, 1950, Serial No. 181,089

5 Claims. (Cl. 73—304)

This invention relates to devices for indicating the quantity of a liquid within a container which depend for their operation upon the variation of the capacitance of a condenser in accordance with the dielectric constant of the material between its plates. Such devices are known in which a plurality of condensers connected in parallel are distributed within the space which may contain liquid. Those condensers (or parts of condensers) immersed in the liquid will have their capacitances increased by an amount (K–1) times that when not immersed. (K being the dielectric constant of the liquid) and thus if the condensers are distributed substantially uniformly throughout the volume of liquid their capacitance will give a measure of a function of the dielectric constant and volume of the liquid. However, liquids vary in dielectric constant and density and in many circumstances the quantity of liquid is required not in terms of volume, but of mass. In such circumstances an indication is required which is compensated both for the density and dielectric constant of the liquid, and is thus also compensated for its temperature.

Devices of the kind referred to may be used as fuel contents gauges for aircraft, the type of fuel gauge having a float operating some kind of telemetric device being undesirable for a variety of reasons.

The object of the present invention is to provide a device of the type referred to indicating the mass of fluid in a container, the said indication being independent of both the dielectric constant and the density of the liquid.

According to the present invention, a device of the type referred to comprises a reference condenser whose capacitance varies linearly with the quotient of the dielectric constant of the liquid minus unity and the density of the liquid, means to generate a first electric current substantially proportional to capacitance of said reference condenser, means to generate a first backing-off current equal to said first current when dielectric constant of said liquid is unity, condenser means distributed through the space to be occupied by said liquid, the capacitance of said condenser means varying substantially linearly with the product of the dielectric constant minus unity and the volume of said liquid in said space, means to generate a second current proportional to capacitance of said condenser means, means to generate a second backing off current equal to said second current when volume of liquid in said space is zero, and a ratiometer indicating the ratio of the difference between said first and first backing-off current and said second and second backing-off currents, said ratio being substantially proportional to the mass of liquid in the aforesaid space.

Preferably said first and second backing off currents are proportional respectively to the capacitances of first and second trimmer condensers.

Preferably said reference condenser comprises uniformly spaced plate means supported by a suitable buoyant member in a vessel containing liquid identical with that in said space, the amount of the plate means submerged within said liquid being inversely proportional to the density of said liquid.

Figure 2:
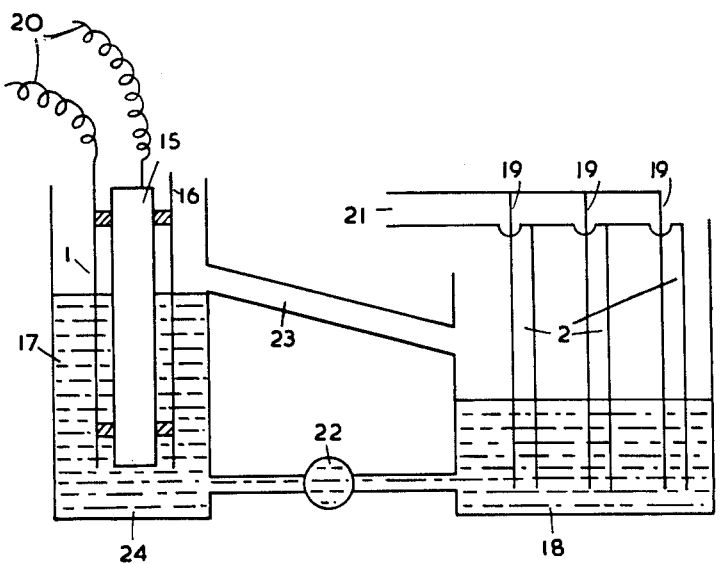

An embodiment of the invention in which it is applied to a fuel contents indicating system will now be described with reference to the accompanying drawings of which Figure 1 shows a circuit diagram of the whole device and Figure 2 illustrates in further detail the reference condenser 1, and the condenser means 2, and the relation between them.

An A. C. source 6 is connected to the primary of a transformer 5 having two centre-tapped secondary windings 7 and 8. Refererence condenser 1 is connected in series with the first preset trimmer condenser 3 across winding 7, while the junction of the condensers 1 and 3 is connected, through a suitable rectifier 25 and one winding 9 of a ratiometer, to the centre tap of winding 7. The condenser means 2 are connected in series with the second preset trimmer condenser 4 across winding 8 and the junction of these condensers is connected through a suitable rectifier 26 and the second winding 10 of the ratiometer to the centre-top of winding 8.

Reference condenser 1 comprises a hollow metallic cylinder 15 and a further metallic cylinder 16, coaxial therewith but attached thereto and spaced therefrom by insulators, the cylinders 15 and 16 floating in a quantity 17 of fuel contained in an auxiliary tank 24, and having connecting leads 20. Condenser means 2 comprise a number of pairs of insulated plates 19 distributed about the main fuel tank 18 and connected in parallel to leads 21 so that the capacitance of the portions of the plates immersed in fuel is proportional to the volume of fuel. Fuel is pumped continuously by a pump 22 from the tank 18 to the auxiliary tank 24, while a return pipe 23 is provided between the auxiliary tank 24 and the main tank 18, thereby ensuring that the fuel 17 is always representative of the fuel in the tank 18.

The ratiometer is of a well-known type, coils 9 and 10 being set at right angles and the pointer 13 being controlled by a permanent magnet 11 pivoted about an axis 12 and reading against a scale 14.

The action of the gauge is as follows:

The capacitance of reference condenser 1 is of the form $$A + B \frac{(K-1)}{\rho}$$

where A and B are constants, $\rho$ the density and K the dielectric constant of the fluid, as is seen by the application of well-known hydrostatic and electrical principles.

If the effective impedance of transformer winding 7 and the input impedance of the rectifier feeding ratiometer winding 9 is very much less than that of either condenser 1 or condenser 3 at the frequency of source 6, the current through winding 9 will be clearly proportional to the difference between the capacitances of these condensers.

If condenser 3 is therefore adjusted to have a capacitance A, i. e. a capacitance equal to that of condenser 1 when the fuel 17 has dielectric constant unity (or more conveniently, when the auxiliary tank 24 is empty) the current in coil 9 will be proportional to $$\frac{(K-1)}{\rho}$$

The capacitance of condenser 2 will be of the form $$C + DV(K-1)$$

where V is the volume of liquid in tank 18 and C, D are constants. Condenser 4 is adjusted to have a capacitance equal to that of condenser 2 when tank 18 is empty so, if the impedances of condensers 2 and 4 satisfy the same conditions with regard to the impedance of winding 8 and coil 10 as those satisfied by condensers 1 and 3, winding 7 and coil 9, the current through winding 10 will be proportional to $(K-1).V$.

The ratiometer will indicate the ratio of these currents, through windings 9 and 10, i. e. it will indicate, when the scale is suitably calibrated, the quantity $\rho V$, which is equal to the mass of fluid.

The gauge is adjusted as follows:

With tank 18 empty and a quantity of fuel 17 in tank 24, trimmer 4 is adjusted until magnet 11 is parallel with the axis of coil 9; there being then no current in coil 10. Then with a quantity of fuel in the tank 18 but with no fuel in tank 24, trimmer 3 is adjusted until magnet 11 is parallel with coil 10.

It will be clear to those skilled in the art that the process of adjustment described above will also result in the removal of the effects of the various stray capacitances which will inevitably be present, and it will also be clear that if transformer windings 7 and 8 are not in fact centretapped the gauge will still be operative, as all that the currents through trimmer 3 and 4 are required to do is to cancel out the current through what might be called the "empty" capacitance of condensers 1 and 2 respectively.

The ratiometer has been described as of the moving magnet type for the sake of simplicity. However, such a ratiometer has the disadvantage that the scale becomes very crowded towards the "high" end, and it is preferable to use in practice a ratiometer of the type described in British patent specification No. 561,866 which has an equal division adjusted scale with the high values expanded to increase readability.

I claim:

1. In a liquid contents gauge for indicating the quantity of liquid in a given space, reference condenser means comprising a vessel, means to supply to said vessel a sample of the liquid in the said space, first and second cylindrical plates spaced apart from each other, means attached to said plates for forming a buoyant assemblage having a cylindrical flotation portion, the axes of said plates and said flotation portion being substantially parallel to one another, whereby said plates are supported by flotation in said liquid sample, the space between said plates being accessible to said liquid sample, whereby the capacitance between said plates varies substantially linearly with the quotient of the dielectric constant minus unity and the density of the liquid sample.

2. A liquid contents gauge for indicating the mass of liquid in a container comprising the combination of a reference condenser, said reference condenser comprising two plates spaced apart from each other; means attached to said plates for forming therewith a buoyant assemblage adapted to support said plates by flotation in a vessel adapted to contain liquid identical with that contained in said container, the space between said plates being occupied by liquid to an extent dependent upon the density of the liquid, said plates and said buoyant assemblage being so shaped and arranged that the capacitance of the reference condenser varies linearly with the quotient of the dielectric constant minus unity, and the density of the liquid; a first A. C. source connected in series with said reference condenser to produce a first electric current substantially proportional to its capacitance; means to produce a first backing-off current equal to said first current when the dielectric constant of said liquid is unity; means to combine said first current and said first backing-off current in opposition to give a first metering current proportional to the quotient of the dielectric constant minus unity, and the density of the liquid; condenser means distributed through the space to be occupied by said liquid, the capacitance of said condenser means varying substantially linearly with the product of the dielectric constant minus unity, and the volume of said liquid in said space; a second A. C. source connected in series with said condenser means to produce a second current substantially proportional to its capacitance; means to produce a second backing-off current equal to said second current when the volume of liquid in said space is zero; means to combine said second current and said second backing-off current in opposition to give a second metering current proportional to the product of the dielectric constant minus unity, and the volume of the liquid in the said space; a ratiometer; and means to apply said first and second currents to said ratiometer, said ratiometer serving to indicate the ratio between said first and second metering currents and thus to give an indication substantially proportional to the mass of liquid in the aforesaid space.

3. A liquid contents gauge for indicating the mass of liquid in a container comprising the combination of a reference condenser, said reference condenser comprising two cylindrical plates spaced apart from one another in coaxial relation; means attached to said plates for forming therewith a buoyant assemblage having a cylindrical flotation portion adapted to support said plates by flotation in a vessel adapted to contain a sample of the liquid contained in said container, the space between said plates being occupied by liquid to an extent dependent upon the density of the liquid, said plates and said cylindrical flotation portion having their axes parallel, whereby the capacitance of the reference condenser varies linearly with the quotient of the dielectric constant minus unity, and the density of the liquid; a first A. C. source connected in series with said reference condenser to produce a first electric current substantially proportional to its capacitance; means to produce a first backing-off current equal to said first current when the dielectric constant of said liquid is unity; means to combine said first current and said first backing-off current in opposition to give a first metering current proportional to the quotient of the dielectric constant minus unity, and the density of the liquid; condenser means distributed through the space to be occupied by said liquid, the capacitance of said condenser means varying substantially linearly with the product of the dielectric constant minus unity, and the volume of said liquid in said space; a second A. C. source connected in series with said condenser means to produce a second current substantially proportional to its capacitance; means to produce a second backing-off current equal to said second current when the volume of liquid in said space is zero; means to combine said second current and said second backing-off current in opposition to give a second metering current proportional to the product of the dielectric constant minus unity, and the volume of the liquid in the said space; a ratiometer; and means to apply said first and second currents to said ratiometer, said ratiometer serving to indicate the ratio between said first and second metering currents, and thus to give an indication substantially proportional to the mass of liquid in the aforesaid space.

4. In a device to measure liquid contents, the combination of a main compartment, an auxiliary compartment connected to said main compartment, means to maintain the volume of liquid in said auxiliary compartment substantially constant, means to circulate liquid to be gauged from one compartment to another to assure representativeness of the liquid in said auxiliary compartment, first electric means to measure a value which is a function of the density and dielectric constant of the liquid in said auxiliary compartment, a second electric means to measure a value which is a function of the volume and dielectric constant of the liquid in said main compartment, a computing circuit, both said electric means being connected to said computing circuit as inputs, said computing circuit producing outputs respectively proportional to the product of a term which is the function of the dielectric constant and the reciprocal of the density and to the product of the term and the volume of the liquid in the main compartment, and a ratiometer connected to the outputs of said computing circuit whereby to indicate a resultant signal which represents the product of the density and the volume of the liquid being gauged.

5. In a liquid contents gauge for indicating the quantity of liquid in a given space, reference condenser means comprising a vessel, means to supply to said vessel a sample of the liquid in the said space, first and second plates spaced apart from each other, means attached to said plates for supporting them by flotation in said liquid sample, the space between said plates being accessible to said liquid sample, said means and said plates being so shaped and disposed that the capacitance between said plates varies substantially linearly with the quotient of the dielectric constant minus unity and the density of the liquid sample.

References Cited in the file of this patent

UNITED STATES PATENTS

| | | |
|---|---|---|
| 2,300,562 | Freystedt | Nov. 3, 1942 |
| 2,377,275 | Smith | May 29, 1945 |
| 2,541,743 | Brockman et al. | Feb. 13, 1951 |
| 2,581,085 | Edelman | Jan. 1, 1952 |

FOREIGN PATENTS

| | | |
|---|---|---|
| 441,576 | Great Britain | Jan. 22, 1936 |
| 114,980 | Sweden | Sept. 18, 1945 |